(12) United States Patent
Kodama

(10) Patent No.: US 8,701,729 B2
(45) Date of Patent: Apr. 22, 2014

(54) PNEUMATIC RADIAL TIRE

(75) Inventor: Norihiko Kodama, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 26 days.

(21) Appl. No.: 13/325,204

(22) Filed: Dec. 14, 2011

(65) Prior Publication Data

US 2012/0186717 A1 Jul. 26, 2012

(30) Foreign Application Priority Data

Jan. 26, 2011 (JP) .................................. 2011-014365

(51) Int. Cl.
*B60C 15/00* (2006.01)
*B60C 15/06* (2006.01)

(52) U.S. Cl.
USPC ........... 152/543; 152/539; 152/546; 152/552; 152/554; 152/555

(58) Field of Classification Search
CPC ................................ B60C 15/00; B60C 15/06
USPC ................................................. 152/539–555
IPC ............................................. B06C 15/00, 15/06
See application file for complete search history.

(56) References Cited

FOREIGN PATENT DOCUMENTS

| JP | 53-119501 | A |   | 10/1978 | |
|----|-----------|---|---|---------|---|
| JP | 60035609  | A | * | 2/1985  | B60C 15/06 |
| JP | 60-088612 | A |   | 5/1985  | |
| JP | 05155208  | A | * | 6/1993  | B60C 15/06 |
| JP | 5-319035  | A |   | 12/1993 | |
| JP | 6-183224  | A |   | 7/1994  | |
| JP | 6-191240  | A |   | 7/1994  | |
| JP | 9-086111  | A |   | 3/1997  | |
| JP | 10-035230 | A |   | 2/1998  | |
| JP | 2005-297927 | A |   | 10/2005 | |
| JP | 2009-179296 | A |   | 8/2009  | |

OTHER PUBLICATIONS

Machine Translation: JP05-155208; Hirokawa et al.; no date.*
German Office Action dated Dec. 11, 2012, issued in corresponding German Patent Application No. 10 2012 100 557.5, with English translation (10 pages).
Japanese Office Action dated Dec. 25, 2012, issued in corresponding Japanese Patent Application No. 2011-014365, with English translation (4 pages).
Chinese Office Action dated Dec. 27, 2013, issued in corresponding Chinese application No. 201210012317.8, w/English translation.

* cited by examiner

*Primary Examiner* — Justin Fischer
*Assistant Examiner* — Kendra Shin
(74) *Attorney, Agent, or Firm* — Westerman, Hattori, Daniels & Adrian, LLP

(57) ABSTRACT

A pneumatic radial tire has a carcass ply which extends between bead cores arranged in a pair of bead portions. The carcass ply is wound up to an outer side in a tire radial direction around the bead cores. A chafer is arranged in such a manner as to wrap around the carcass ply from an inner side to an outer side in a tire width direction, around the bead core. An inner end of the chafer positioned in the inner side in the tire width direction is arranged in the outer side in the tire radial direction than a winding end of the carcass ply. A reinforcing rubber tapering off toward the outer side in the tire radial direction is provided adjacently to the outer side in the tire radial direction of the inner end of the chafer.

6 Claims, 2 Drawing Sheets

PNEUMATIC RADIAL TIRE

BACKGROUND OF THE INVENTION

1. Field of the Invention

The present invention relates to a pneumatic radial tire which is excellent in a durability of a bead portion.

2. Description of the Related Art

Conventionally, in a pneumatic radial tire, particularly in a tire which is used in a heavy vehicle such as an industrial vehicle, a construction vehicle or the like, there is fear that a malfunction such as a separation or the like comes about while beginning at a winding end of a carcass ply which is wound up around a bead core, and a provision of a chafer is generally carried out for improving a durability of a bead portion. The chafer is arranged around the bead core in such a manner as to wrap around a carcass ply from an inner side to an outer side in a tire width direction (refer, for example, to Japanese Unexamined Patent Publication No. 53-119501, Japanese Unexamined Patent Publication No. 5-319035, Japanese Unexamined Patent Publication No. 6-191240, and Japanese Unexamined Patent Publication No. 2005-297927).

Further, the inventor of the present invention has obtained such a knowledge that it is possible to reduce a stress concentration onto a winding end of a carcass ply so as to suppress a generation of a separation by arranging an inner end of a chafer which is positioned in an inner side in a tire width direction, in an outer side in a tier radial direction than the winding end of the carcass ply. And, arranging the chafer as mentioned above is disclosed in Japanese Unexamined Patent Publication No. 53-119501, Japanese Unexamined Patent Publication No. 5-319035, and Japanese Unexamined Patent Publication No. 2005-297927. However, in the case mentioned above, it has found that a trouble such as a separation or the like tends to be generated while beginning at the inner end of the chafer.

SUMMARY OF THE INVENTION

Accordingly, an object of the present invention is to provide a pneumatic radial tire which suppresses a trouble such as a separation or the like not only at a winding end of a carcass ply but also at an inner end of a chafer, and is excellent in a durability of a bead portion.

The inventor of the present invention devotes himself to make a study again and again for achieving the above mentioned object, and as a result, has found that a deformation of a compression and a tension caused by tensile force acting on a ply cord is dominant with regard to the trouble at the winding end of the carcass ply, and a shear deformation in a tire circumferential direction is dominant with regard to the trouble at the inner end of the chafer. The present invention is made on the basis of the knowledge mentioned above, and can achieve the above mentioned object with the structure mentioned below.

The present invention provides a pneumatic radial tire comprising a carcass ply which extends between bead cores arranged in a pair of bead portions, and is wound up to an outer side in a tire radial direction around the bead cores, and a chafer which is arranged in such a manner as to wrap around the carcass ply from an inner side to an outer side in a tire width direction, around the bead core, wherein an inner end of the chafer positioned in the inner side in the tire width direction is arranged in the outer side in the tire radial direction than a winding end of the carcass ply, and a reinforcing rubber tapering off toward the outer side in the tire radial direction is provided adjacently to the outer side in the tire radial direction of the inner end of the chafer.

In the pneumatic radial tire in accordance with the present invention, since the inner end of the chafer is arranged in the outer side in the tire radial direction than the winding end of the carcass ply, it is possible to suppress the trouble such as the separation at the winding end of the carcass ply. In addition, since the reinforcing rubber tapering off toward the outer side in the tire radial direction is provided adjacently to the outer side in the tire radial direction of the inner end of the chafer, it is possible to restrict the shear deformation in the tire circumferential direction of the chafer by the dead weight action of the reinforcing rubber at a time when the tire rolls, and it is possible to suppress the trouble such as the separation or the like at the inner end of the chafer.

The dead weight action of the reinforcing rubber means the matter that the reinforcing rubber presses the inner end of the chafer toward the inner side in the tire radial direction so as to act like a dead weight. In other words, in the present invention, since the reinforcing rubber is formed such a shape as to taper off toward the outer side in the tire radial direction, the reinforcing rubber is pressed to the inner side in the tire radial direction by the internal pressure action of the tire, and presses the inner end of the adjacent chafer toward the inner side in the tire radial direction. With the dead weight action mentioned above, it is possible to restrict the shear deformation to the tire circumferential direction of the chafer, and therefore, it is possible to suppress the generation of the trouble at the inner end of the chafer.

In the structure mentioned above, it is preferable that a thickness of the reinforcing rubber is equal to or more than 3 mm at a position in the inner end of the chafer, and a distance from the inner end of the chafer to a leading end of the reinforcing rubber is equal to or more than 30 mm. With this structure, it is possible to secure a volume of the reinforcing rubber so as to enhance an effectiveness of the deadweight action mentioned above, and well suppress the trouble such as the separation or the like at the inner end of the chafer.

In the structure mentioned above, it is preferable that the reinforcing rubber has an extension portion which extends from the inner end toward the inner side in the tire radial direction along the chafer. With this structure, since it is possible to easily and integrally handle the chafer and the reinforcing rubber, there is such an advantage that it is possible to improve a workability at a time of forming the tire, and it is possible to avoid the air mixing into the step between the members.

In the structure mentioned above, it is preferable that a peripheral portion of the inner end of the chafer and the portion interposed between the chafer and the carcass ply in the reinforcing rubber are formed by a rubber having a higher modulus than an outer portion in the tire radial direction in the reinforcing rubber. With this structure, it is possible to enhance the effect of suppressing the trouble at the inner end of the chafer.

DETAILED DESCRIPTION OF PREFERRED EMBODIMENTS

Figure 1:
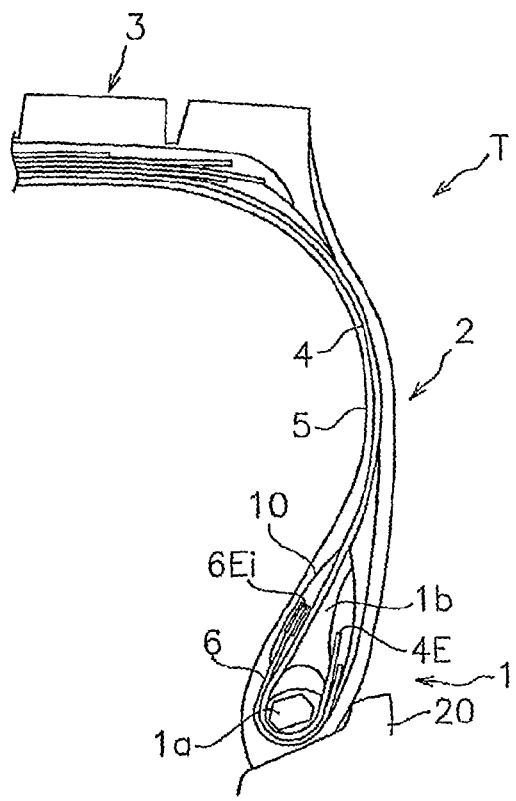
FIG. 1 is a half cross sectional view of a tire meridian showing an example of a pneumatic tire in accordance with the present invention.
Figure 2:
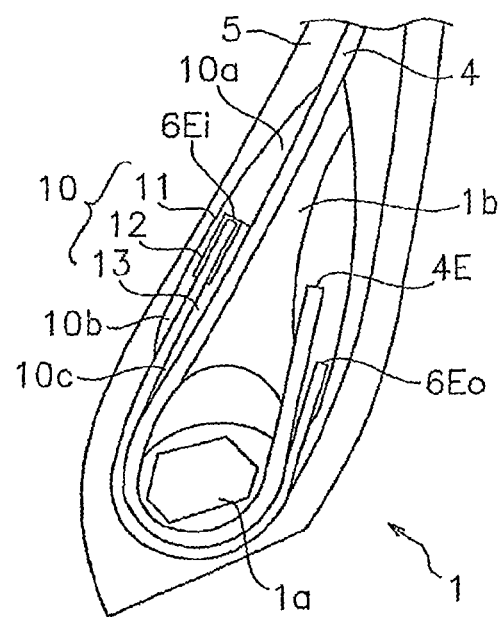
FIG. 2 is a view showing a bead portion of a tire in FIG. 1 in an enlarged manner.

A description will be given below of an embodiment in accordance with the present invention with reference to the accompanying drawings. A pneumatic radial tire T shown in FIGS. 1 and 2 is provided with a pair of bead portions 1, side wall portions 2 which extend to an outer side in a tire radial direction from the bead portions 1, and a tread portion 3 which is connected to outer ends in the tire radial direction of the side wall portions 2 so as to construct a tread surface. In the bead portion 1, there are arranged an annular bead core 1a which is constructed by a convergence body obtained by laminating and winding a rubber coated bead wire, and a bead filler 1b which is positioned in an outer side in the tire radial direction of the bead core 1a.

The carcass ply 4 extends between the bead cores 1a which are arranged in a pair of bead portions 1, and is wound up to the outer side in the tire radial direction around the bead core 1a. Reference symbol 4E denotes a winding end of the carcass ply 4. The carcass ply 4 is formed by coating ply cords lined up in a direction which is approximately orthogonal to the tire circumferential direction with a topping rubber. Steel cord, and organic fiber cord such as polyester, rayon, nylon, aramido and the like is preferably used as the ply cord.

An inner side of the carcass ply 4 is provided with an inner liner 5 which constructs an inner peripheral surface of the tire T. The inner liner 5 has a function of blocking a transmission of a gas which is filled in the tire.

A chafer 6 is arranged in such a manner as to wrap around the carcass ply 4 from an inner side to an outer side in a tire width direction, around the bead core 1a. Reference symbol 6Ei denotes an inner end of the chafer 6 which is positioned in the inner side in the tire width direction, and reference symbol 6Eo denotes an outer end of the chafer 6 which is positioned in the outer side in the tire width direction. The chafer 6 is formed by coating cords which are lined up diagonally (for example, between 20 and 50 degree at a time of installing to a specified rim) with respect to the tire radial direction, with a topping rubber. The cord may be constructed by an organic fiber cord; however, is preferably constructed by a steel cord in the light of enhancing a reinforcing effect.

In this tire T, the inner end 6Ei of the chafer 6 is arranged in the outer side in the tire radial direction than the winding end 4E of the carcass ply 4. In accordance with this, it is possible to effectively suppress the trouble such as the separation or the like at the winding end 4E of the carcass ply 4. It is sufficient that a positional relationship mentioned above is established at a time of installing to the specified rim. The time of installing to the specified rim means a state of installing to a standard rim which is defined by JATMA corresponding to a tire size and setting to an internal pressure which is defined by JATMA.

In the carcass ply 4 at a time when tire rolls (travels), particularly in a used process under a high internal pressure, a deformation of a compression and a tension becomes dominant by tensile force of the ply cord caused by the internal pressure. Since the tensile force caused by the internal pressure acts on the chafer 6 less than the carcass ply 4, and the chafer 6 is accompanied with the positional relationship between the inner end 6Ei and the winding end 4E as mentioned above, it is possible to suppress the trouble at the winding end 4E by appropriately restricting the deformation of the carcass ply 4. However, in the chafer 6 arranged as mentioned above, a shear deformation in the tire circumferential direction accompanying a change of an angle of incline of the cord becomes dominant, and there is fear that the trouble is generated at the inner end 6Ei.

Therefore, the tire T is provided with a reinforcing rubber 10 which tapers off toward an outer side in the tire radial direction, adjacently to the outer side in the tire radial direction of the inner end 6Ei of the chafer 6. The reinforcing rubber 10 extends to the outer side in the tire radial direction while reducing a thickness little by little from the inner end 6Ei. When the tire rolls, the reinforcing rubber 10 which is pressed to the inner side in the tire radial direction by being exposed to the internal pressure action of the tire presses the inner end 6Ei toward an inner side in the tire radial direction so as to act like a dead weight. With this configuration, it is possible to restrict the shear deformation in the tire circumferential direction of the chafer 6, and it is possible to suppress the generation of the trouble such as the separation or the like beginning at the inner end 6Ei.

In the present embodiment, the outer end 6Eo of the chafer 6 is arranged in the inner side in the tire radial direction than the inner end 6Ei of the chafer 6 and the winding end 4E of the carcass ply 4. Therefore, the outer end 6Eo is arranged in such a manner as to avoid a position at which the deformation at a time of rolling is large, and it is possible to prevent a durability from being lowered due to a strain which is generated in the outer end 6Eo.

In the present embodiment, there is shown an example in which the reinforcing rubber 10 is constructed by a rubber pad 11, an edge tape 12 and a reinforcing tape 13, and extends at distances of X and Y respectively up and down based on the inner end 6Ei. An element contributing to the dead weight action among them is a triangular portion 10a which is adjacent to the inner end 6Ei of the chafer 6 from the outer side in the tire radial direction, as shown by a broken line in FIG. 3. Accordingly, in order to achieve the suppressing effect with respect to the malfunction at the inner end 6Ei, the reinforcing rubber 10 may be constructed only by the triangular portion 10a.

The triangular portion 10a which the reinforcing rubber 10 has is provided so as to be interposed between the carcass ply 4 and the inner liner 5. In the light of enhancing the effectiveness of the deadweight action, it is preferable that a thickness T1 of a bottom surface of the triangular portion 10a, that is, a thickness T1 of the reinforcing rubber 10 at a position of the inner end 6Ei is equal to or more than 3 mm, and it is further preferable that a distance X from the inner end 6Ei to a leading end of the reinforcing rubber 10 is equal to or more than 30 mm. Further, it is preferable to make the thickness T1 equal to or less than 7.0 mm, and make the distance X equal to or less than 40 mm, in such a manner as to prevent the reinforcing rubber 10 from becoming larger than necessary.

A thickness T2 of the reinforcing rubber 10 at a position which is a distance X/2 away from the inner end 6Ei preferably goes beyond 0.5 times the thickness T1, and more preferably goes beyond 0.5 times the thickness T1 and is equal to or less than 0.7 times. With this configuration, it is possible to make the reinforcing rubber 10 thick so as to enhance the effectiveness of the dead weight action. In this case, it is possible to smoothly form a side surface of the thick reinforcing rubber 10, by constructing a side surface in the inner side in the tire width direction of the triangular portion 10a by a smoothly curved circular arc shaped surface.

It is preferable that the inner end 6Ei of the chafer 6 faces to a center of a bottom surface of the triangular portion 10a. Accordingly, force by which the reinforcing rubber 10 presses the inner end 6Ei toward the inner side in the tire radial direction is easily transmitted, and it is possible to enhance the effectiveness of the dead weight action. In order to arrange the inner end 6Ei as mentioned above, it is preferable that the reinforcing rubber 10 has an extension portion 10c as mentioned below.

In the present embodiment, the reinforcing rubber 10 has extension portions 10b and 10c which extend to the inner side in the tire radial direction from the inner end 6Ei along the chafer 6. In a region at a distance Y from the inner end 6Ei of the chafer 6, the extension portion 10b is adjacent from the inner side in the tire width direction, and the extension portion 10c is adjacent from the outer side in the tire width direction. With this structure, since it is possible to easily and integrally handle the chafer 6 and the reinforcing rubber 10, there is such an advantage that it is possible to improve a workability at a time of forming the tire, and it is possible to avoid the air mixing into the step between the members. Further, there is such an advantage that it is possible to dissolve a discontinuousness of the rigidity so as to suppress a stress concentration.

It is preferable that the thickness T3 of the extension portion 10b in a side portion of the inner end 6Ei is equal to or more than 1 mm, and it is preferable that the distance Y from the inner end 6Ei to the leading end of the extension portion 10b is equal to or more than 15 mm. With this configuration, there is such an advantage that it is possible to avoid the air mixing into the step between the members. Further, it is preferable to make the thickness T3 equal to or less than 3.5 mm, and make the distance Y equal to or less than 35 mm, in such a manner as to prevent the reinforcing rubber 10 from becoming larger than necessary. It is preferable that a dimension of the extension portion 10c is based on this.

In the present embodiment, in the reinforcing rubber 10, a peripheral portion of the inner end 6Ei is constructed by the edge tape 12, and the portion interposed between the carcass ply 4 and the chafer 6 is constructed by the reinforcing tape 13. The edge tape 12 is attached like a U-shaped form to the inner end 6Ei of the chafer 6, and achieves a suppression of a generation and a progress of the separation beginning at the inner end 6Ei. A thickness of the edge tape 12 is, for example, between 0.4 and 1.0 mm. The edge tape 12 and the reinforcing tape 13 can be formed by a rubber having the same composition as the rubber pad 11, and may be formed by a rubber having a different composition. Further, the edge tape 12 may be formed by an organic fiber such as a nylon or the like.

Figure 3:
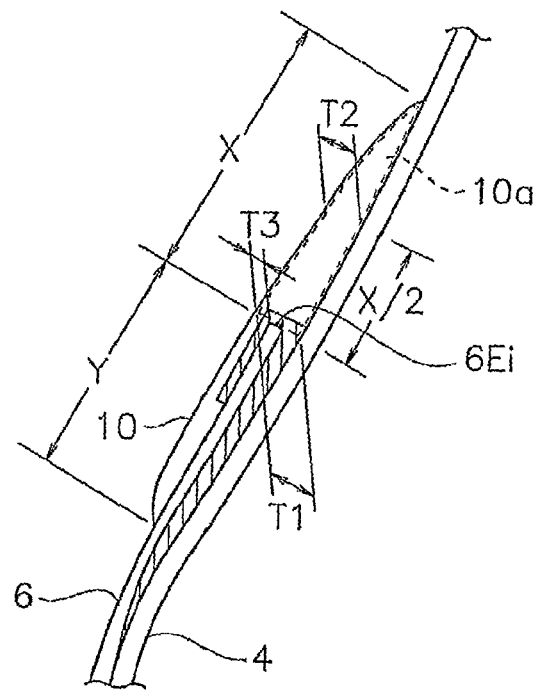
FIG. 3 is a conceptual diagram for explaining a structure of a reinforcing rubber.

It is possible to enhance the effect of suppressing the malfunction at the inner end 6Ei by forming the peripheral portion of the inner end 6Ei and the portion interposed between the chafer 6 and the carcass ply 4 in the reinforcing rubber 10, by a rubber having a higher modulus than the outer portion in the tire radial direction in the reinforcing rubber 10, such as an example mentioned below. It can be thought that this is caused mainly by the matter that the outer portion of the reinforcing rubber 10 corresponding to the triangular portion 10a tends to be deflected, whereby the dead weight action of the reinforcing rubber 10 improves. In FIG. 3, this high modulus portion is shown by a diagonal line.

The modulus in the high modulus portion mentioned above is, for example, between 2.2 and 6.2 MPa, more preferably between 4.0 and 4.4 MPa, and is preferably 0.6 MPa or more higher than the modulus of the outer portion in the reinforcing rubber 10. The modulus of the outer portion is, for example, between 1.6 and 6.2 MPa, and more preferably between 3.4 and 4.4 MPa. These numerical values indicate 100% tension modulus which is measured at 25° C. based on JISK6251: 2004.

In the present embodiment, since, in the reinforcing rubber 10, the peripheral portion of the inner end 6Ei is constructed by the edge tape 12, and the portion interposing between the carcass ply 4 and the chafer 6 is constructed by the reinforcing tape 13, it is possible to easily form the high modulus portion as mentioned above, by changing the rubber composition.

Figure 4:
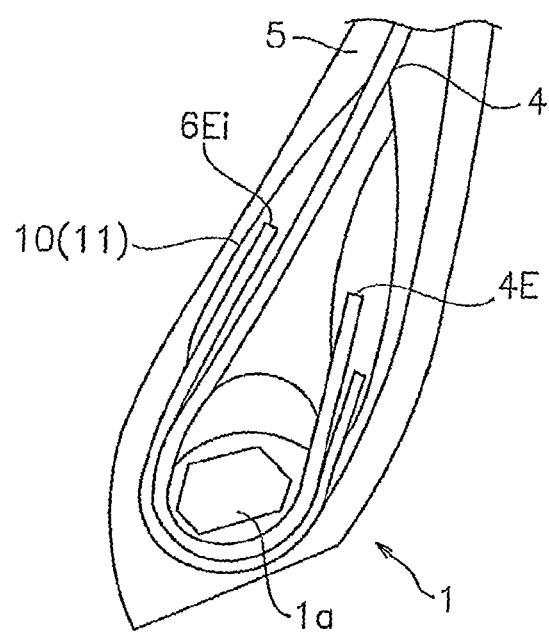
FIG. 4 is a cross sectional view showing a reinforcing rubber in accordance with another embodiment of the present invention.

In the present embodiment, there is shown the example in which the reinforcing rubber 10 is constructed by three members such as the rubber pad 11, the edge tape 12 and the reinforcing tape 13, however, the reinforcing rubber 10 can be constructed by a simple substance of the rubber pad 11 as shown in FIG. 4. In this structure, in the case of forming the high modulus portion mentioned above, it is sufficient that the rubber composition is differentiated in the portion corresponding to it in the reinforcing rubber 10.

The pneumatic radial tire in accordance with the present invention is the same as the normal pneumatic tire except the structure as mentioned above of the bead portion, and the present invention can employ any of the conventionally known material, shape, structure, manufacturing method and the like. For example, it is sufficient that at least one carcass ply 4 is arranged, and a plurality of carcass plies may be arranged in an overlapping manner.

Since the pneumatic radial tire in accordance with the present invention is excellent in the durability of the bead portion, it is useful as a pneumatic radial tire for a heavy load which is used in a heavy vehicle such as a truck, a bus, an industrial vehicle, a construction vehicle or the like.

EXAMPLE

Since a durability test of the bead portion was carried out for specifically showing the structure and the effect of the present invention, a description will be given below. A size of a tire provided for the test is 11R22.5, and was installed to a rim having a rim size under JATMA provision.

In the durability test, it was traveled at a fixed distance (13000 km) on a drum while rising up a load step by step starting from 230% of a normal condition of JATMA, under a condition of an internal pressure of 900 kPa and a speed of 40 km/h. Thereafter, the tire was dismantled, and a separation amount and a crack amount at the inner end of the chafer were searched. The separation amount is a length at which the cord of the chafer peels from the topping rubber, and the crack amount is a length of a crack of the rubber which is generated by a progress of the separation. An average value in each of a serial side and an opposite serial side is calculated.

Comparative Example 1

A comparative example 1 was set to a structure which is the same as the example 2 except the edge tape 12 being attached to the inner end 6Ei of the chafer 6, in place of the provision of the reinforcing rubber 10, in the tire structure shown in FIGS. 1 and 2.

Examples 1 to 3

Structures which are provided with the tire structure shown in FIGS. 1 and 2 were set to examples 1 to 3. In the example 1, the thickness T1 was set to 3 mm, and the distance X was made less than 30 mm, and in the examples 2 and 3, the thickness T1 was set to 3 mm, and the distance X was set to 30 mm. Further, in the examples 1 and 2, the modulus of the reinforcing rubber 10 was uniformly set to 4.2 MPa, and in the example 3, the modulus of the high modulus portion in the reinforcing rubber 10 (the diagonal lined portion in FIG. 3)

was set to 4.2 MPa, and the modulus of the remaining portion was set to 3.6 MPa. Results of the evaluation are shown in Table 1.

TABLE 1

|  | Comparative example 1 | Example 1 | Example 2 | Example 3 |
|---|---|---|---|---|
| crack amount (mm) | 2 | 0 | 0 | 0 |
| separation amount (mm) | —(*1) | 8 | 6.5 | 5 |

(*1) it became incapable of traveling due to generation of crack until traveling at fixed distance As in Table 1, the generation of the crack was significant in the comparative example 1, and the progress of the separation was suppressed while preventing the generation of the crack at the inner end of the chafer in the examples 1 to 3, so that it is known that a durability of the bead portion improves.

What is claimed is:

1. A pneumatic radial tire comprising:
a carcass ply which extends between bead cores arranged in a pair of bead portions, and is wound up to an outer side in a tire radial direction around the bead cores; and
a chafer which is arranged in such a manner as to wrap around the carcass ply from an inner side to an outer side in a tire width direction, around the bead core,
wherein an inner end of the chafer positioned in the inner side in the tire width direction is arranged in the outer side in the tire radial direction than a winding end of the carcass ply, and a reinforcing rubber tapering off toward the outer side in the tire radial direction provided adjacently to the outer side in the tire radial direction of the inner end of the chafer
and further wherein the reinforcing rubber has a triangular portion which is adjacent to the inner end of the chafer from the outer side in the tire radial direction, an extension portion which extends from the inner end toward the inner side in the tire radial direction along the chafer and is adjacent to the chafer from the inner side in tire width direction, and an extension portion which extends from the inner end toward the inner side in the tire radial direction along the chafer and is adjacent to the chafer from the outer side in the tire width direction
wherein a thickness of the reinforcing rubber is equal to or more than 3 mm at a position in the inner end of the chafer, and a distance from the inner end of the chafer to a leading end of the reinforcing rubber is equal to or more than 30 mm.

2. A pneumatic radial tire comprising:
a carcass ply which extends between bead cores arranged in a pair of bead portions, and is wound up to an outer side in a tire radial direction around the bead cores; and
a chafer which is arranged in such a manner as to wrap around the carcass ply from an inner side to an outer side in a tire width direction, around the bead core,
wherein an inner end of the chafer positioned in the inner side in the tire width direction is arranged in the outer side in the tire radial direction than a winding end of the carcass ply, and reinforcing rubber tapering off toward the outer side in the tire radial direction is provided adjacently to the outer side in the tire radial direction of the inner end of the chafer
and further wherein the reinforcing rubber has a triangular portion which is adjacent to the inner end of the chafer from the outer side in the tire radial direction an extension portion which extends from the inner end toward the inner side in the tire radial direction along the chafer and is adjacent to the chafer from the inner side in the tire width direction, and an extension portion which extends from the inner end toward the inner side in the tire radial direction along the chafer and is adjacent to the chafer from the outer side in the tire width direction
wherein a peripheral portion of the inner end of the chafer and the portion interposed between the chafer and the carcass ply in the reinforcing rubber are formed by a rubber having a higher modulus than an outer portion in the tire radial direction in the reinforcing rubber.

3. The pneumatic radial tire according to claim 2, wherein
a peripheral portion of the inner end of the chafer is constructed by an edge tape attached like a U-shaped;
the portion interposed between the carcass ply and the chafer is constructed by a reinforcing tape; and
the edge tape and the reinforcing tape are formed by a rubber having a higher modulus than the outer portion in the tire radial direction in the reinforcing rubber, respectively.

4. A pneumatic radial tire comprising:
a carcass ply which extends between bead cores arranged in a pair of bead portions, and is wound up to an outer side in a tire radial direction around the bead cores; and
a chafer which is arranged in such a manner as to wrap around the carcass ply from an inner side to an outer side in a tire width direction, around the bead core,
wherein an inner end of the chafer positioned in the inner side in the tire width direction is arranged in the outer side in the tire radial direction than a winding end of the carcass ply, and a reinforcing rubber tapering off toward the outer side in the tire radial direction is provided adjacently to the outer side in the tire radial direction of the inner end of the chafer
and further wherein the reinforcing rubber has a triangular portion which is adjacent to the inner end of the chafer from the outer side in the tire radial direction, an extension portion which extends from the inner end toward the inner side the tire radial direction along the chafer and is adjacent to the chafer from the inner side in the tire width direction, and an extension portion which extends from the inner end toward the inner side in the tire radial direction along the chafer and is adjacent to the chafer from the outer side in the tire width direction wherein
a thickness of the reinforcing rubber is equal to or more than 3 mm at a position in the inner end of the chafer, and a distance from the inner end of the chafer to a leading end of the reinforcing rubber is equal to or more than 30 mm wherein
a side surface in the inner side in the tire width direction of the triangular portion is constructed by a smoothly curved circular arc shaped surface.

5. A pneumatic radial tire comprising:
a carcass ply which extends between bead cores arranged in a pair of bead portions. and is wound up to an outer side in a tire radial direction around the bead cores; and
a chafer which is arranged in such a manner as to wrap around the carcass ply from an inner side to an outer side in a tire width direction, around the bead core,
wherein an inner end of the chafer positioned in the inner side in the tire width direction is arranged in the outer side in the tire radial direction than a winding end of the carcass ply, and a reinforcing rubber tapering off toward the outer side in the tire radial direction is provided adjacently to the outer side in the tire radial direction of the inner end of the chafer and further wherein the reinforcing rubber has a triangular portion which is a adjacent to the inner end of the chafer from the outer side in the tire radial direction, an extension portion which extends from the inner end toward the inner side in the tire radial direction along the chafer and is adjacent to the chafer from the inner side in the tire width direction, and an extension portion which extends from the inner end toward the inner side in the tire radial direction along the chafer and is adjacent to the chafer from the outer side in the tire width direction wherein when X denotes a distance from the inner end of the chafer to a leading end of the reinforcing rubber, a thickness of the reinforcing rubber at a position which is a distance X/2 away from the inner end goes beyond 0.5 times a thickness of a bottom surface of the triangular portion.

6. A pneumatic radial tire comprising:

a carcass ply which extends between bead cores arranged in a pair of bead portions, and is wound up to an outer side in a tire radial direction around the bead cores; and a chafer which is arranged in such a manner as to wrap around the carcass ply from an inner side to an outer side in a tire width direction, around the bead core, wherein inner end of the chafer positioned in the inner side in the tire width direction is arranged in the outer side in the tire radial direction than a winding end of the carcass ply, and a reinforcing rubber tapering off toward the outer side in the tire radial direction is provided adjacently to the outer side in the tire radial direction of the inner end of the chafer and further wherein the reinforcing rubber has a triangular portion which is adjacent to the inner end of the chafer from the outer side in the tire radial direction, an extension portion which extends from the inner end toward the inner side in the tire radial direction along the chafer and is adjacent to the chafer from the inner side in the tire width direction, and an extension portion which extends from the inner end toward the inner side in the tire radial direction along the chafer and is adjacent to the chafer from the outer side in the tire width direction wherein a thickness of the reinforcing rubber is equal to or more than 3 mm at a position in the inner end of the chafer, and a distance from the inner end of the chafer to a leading end of the reinforcing rubber is equal to or more than 30 mm wherein the distance from the inner end of the chafer to the leading end of the extension portion which is adjacent to the chafer from the inner side in the tire width direction, and the distance from the inner end of the chafer to the leading end of the extension portion which is adjacent to the chafer from the outer side in the tire width direction are equal to or more than 15 mm, respectively.

* * * * *